(12) United States Patent
Guo et al.

(10) Patent No.: US 11,593,974 B2
(45) Date of Patent: Feb. 28, 2023

(54) MAP BUILDING METHOD, COMPUTER-READABLE STORAGE MEDIUM AND ROBOT

(71) Applicant: UBTECH ROBOTICS CORP LTD, Shenzhen (CN)

(72) Inventors: Rui Guo, Shenzhen (CN); Zhichao Liu, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 262 days.

(21) Appl. No.: 17/075,727

(22) Filed: Oct. 21, 2020

(65) Prior Publication Data

US 2021/0183116 A1  Jun. 17, 2021

(30) Foreign Application Priority Data

Dec. 11, 2019 (CN) .......................... 201911266982.8

(51) Int. Cl.
| | | |
|---|---|---|
| G06T 11/00 | (2006.01) | |
| G06T 7/13 | (2017.01) | |
| G06T 7/90 | (2017.01) | |
| G06T 7/70 | (2017.01) | |
| G06T 3/00 | (2006.01) | |
| G01C 21/00 | (2006.01) | |

(52) U.S. Cl.
CPC ........ G06T 11/001 (2013.01); G01C 21/3837 (2020.08); G06T 3/0031 (2013.01); G06T 7/13 (2017.01); G06T 7/70 (2017.01); G06T 7/90 (2017.01)

(58) Field of Classification Search
None
See application file for complete search history.

(56) References Cited

U.S. PATENT DOCUMENTS

| | | | | |
|---|---|---|---|---|
| 9,740,925 | B2* | 8/2017 | Haji | .............. G06V 30/2276 |
| 2010/0008576 | A1* | 1/2010 | Piramuthu | ........... G06V 10/267 |
| | | | | 382/173 |
| 2017/0285648 | A1* | 10/2017 | Welty | ............... G05D 1/0248 |
| 2019/0272638 | A1* | 9/2019 | Mouton | .............. G06V 20/698 |
| 2020/0302135 | A1* | 9/2020 | Nirmala | ............... G06K 7/1413 |
| 2021/0019536 | A1* | 1/2021 | Motoyama | ........... G06V 20/588 |
| 2021/0333108 | A1* | 10/2021 | Li | ......................... G01C 21/206 |

* cited by examiner

*Primary Examiner* — James A Thompson

(57) ABSTRACT

A method for building a map includes: acquiring an original grayscale map, preprocessing the original grayscale map to obtain a preprocessed map, binarizing the preprocessed map to obtain a binarized map, performing a boundary filling to the preprocessed map and the binarized map to obtain a boundary-filled preprocessed map and a boundary-filled binarized map, performing a boundary thinning to the boundary-filled binarized map to obtain a thinned binarized map, and performing a boundary thinning to the boundary-filled preprocessed map, according to the thinned binarized map, to obtain a thinned preprocessed map.

20 Claims, 6 Drawing Sheets

Boundary ghosting

Boundary interference

MAP BUILDING METHOD, COMPUTER-READABLE STORAGE MEDIUM AND ROBOT

CROSS REFERENCE TO RELATED APPLICATIONS

This application claims priority to Chinese Patent Application No. 201911266982.8, filed Dec. 11, 2019, which is hereby incorporated by reference herein as if set forth in its entirety.

BACKGROUND

1. Technical Field

The present disclosure generally relates to robots, and particularly to a map building method, a computer-readable storage medium, and a robot.

2. Description of Related Art

When autonomous robots build maps of the surrounding environment, due to uneven roads, poor sensor performance indicators, and robots running back and forth on the same path many times, the boundaries of the constructed grid map may have a ghost image problem. In order to solve the problem, one way is to improve the performance indicators of specific hardware devices, such as using advanced laser sensors. Another way is to use multi-sensor fusion technology, such as adding camera devices, and introducing visual loop optimization. Although these methods can theoretically eliminate the ghost image problem, they will bring extremely high hardware costs and are difficult to be widely used in actual scenarios.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
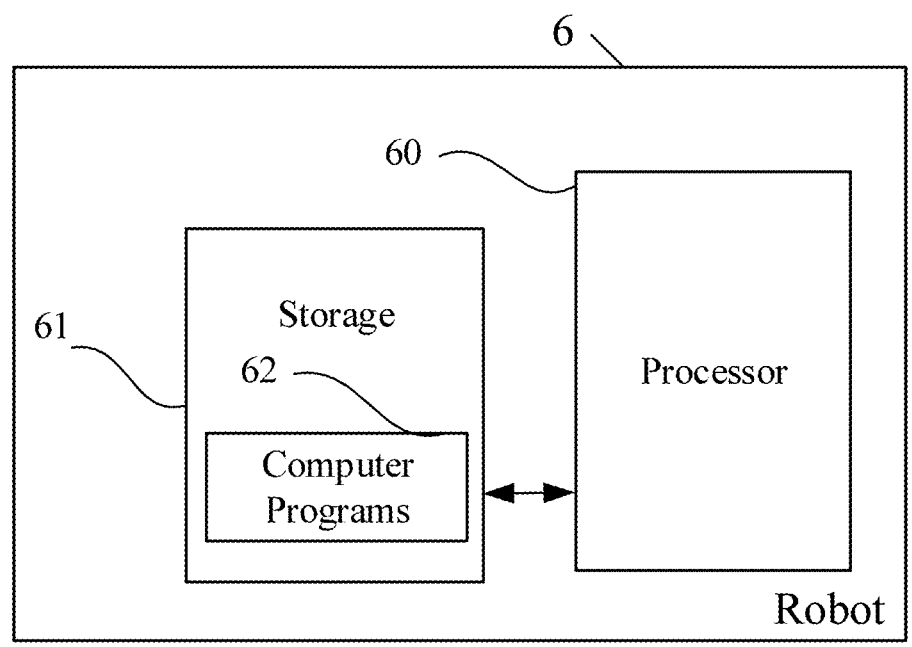
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present disclosure. The terms "first" and "second" are used for descriptive purposes only and are not to be construed as indicating or implying relative importance or implicitly indicating the number of technical features. The meaning of "multiple" is two or more, unless expressly stated otherwise.

Figure 6:
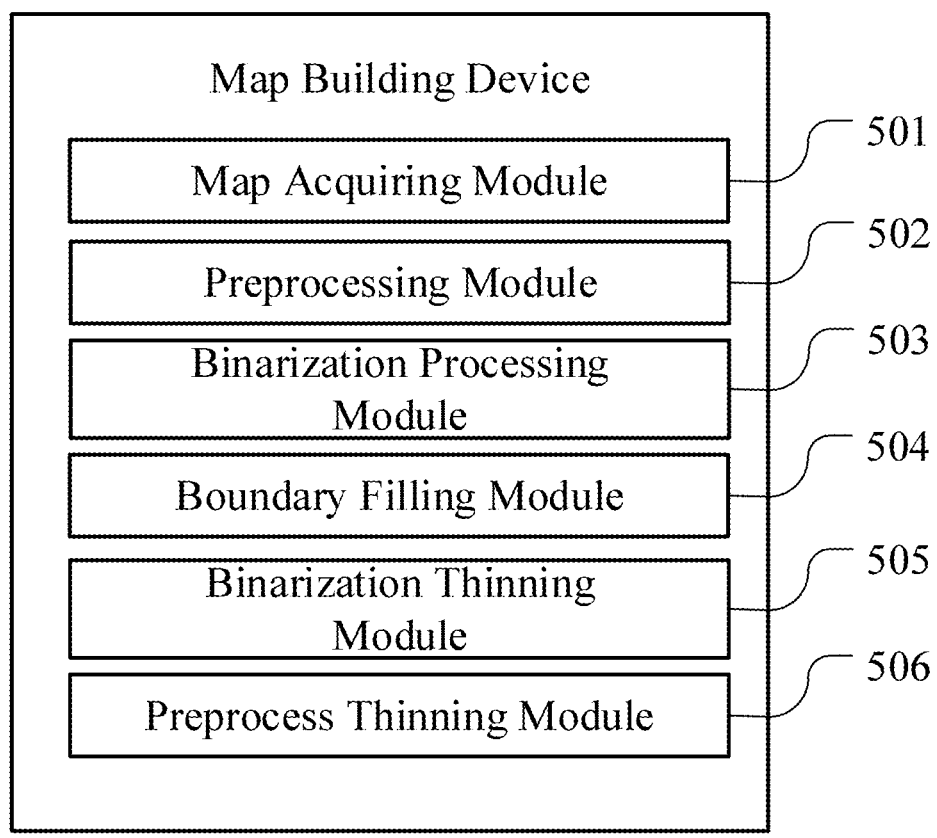
FIG. 6 is a schematic block diagram of a map building device according to one embodiment.

FIG. 1 is a schematic block diagram of an autonomous robot according to one embodiment. The robot 6 includes a processor 60, a storage 61, one or more computer programs 62 stored in the storage 61 and executable by the processor 60. When the processor 60 executes the computer programs 62, the steps in the embodiments of the method for controlling the robot 6, such as steps S101 through S106 in FIG. 2, steps S1041 to S1043 in FIG. 4, and functions of modules/units in the embodiments, such as units 501 through 506 in FIG. 6, are implemented.

Exemplarily, the one or more computer programs 62 may be divided into one or more modules/units, and the one or more modules/units are stored in the storage 61 and executed by the processor 60. The one or more modules/units may be a series of computer program instruction segments capable of performing specific functions, and the instruction segments are used to describe the execution process of the one or more computer programs 62 in the robot 6. For example, the one or more computer programs 62 may be divided into a map acquiring module, a preprocessing module, a binarization processing module, a boundary filling module, a binarization thinning module, and a pre-process thinning module, which will be described in detail below.

It should be noted that FIG. 1 is merely an example of the robot 6, and does not limit the robot 6. The robot 6 may include components different in numbers from those illustrated, or incorporate some other different components. For example, the robot 80 may further include an input and output device, a network access device, a bus, and the like.

The processor 60 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 61 may be an internal storage unit of the robot 6, such as a hard disk or a memory. The storage 61 may also be an external storage device of the robot 6, such as a plug-in hard disk, a smart memory card (SMC), and a secure digital (SD) card, or any suitable flash cards. Furthermore, the storage 61 may also include both an internal storage unit and an external storage device. The storage 61 is used to store computer programs, other programs, and data required by the robot. The storage 61 can also be used to temporarily store data that have been output or is about to be output.

Figure 2:
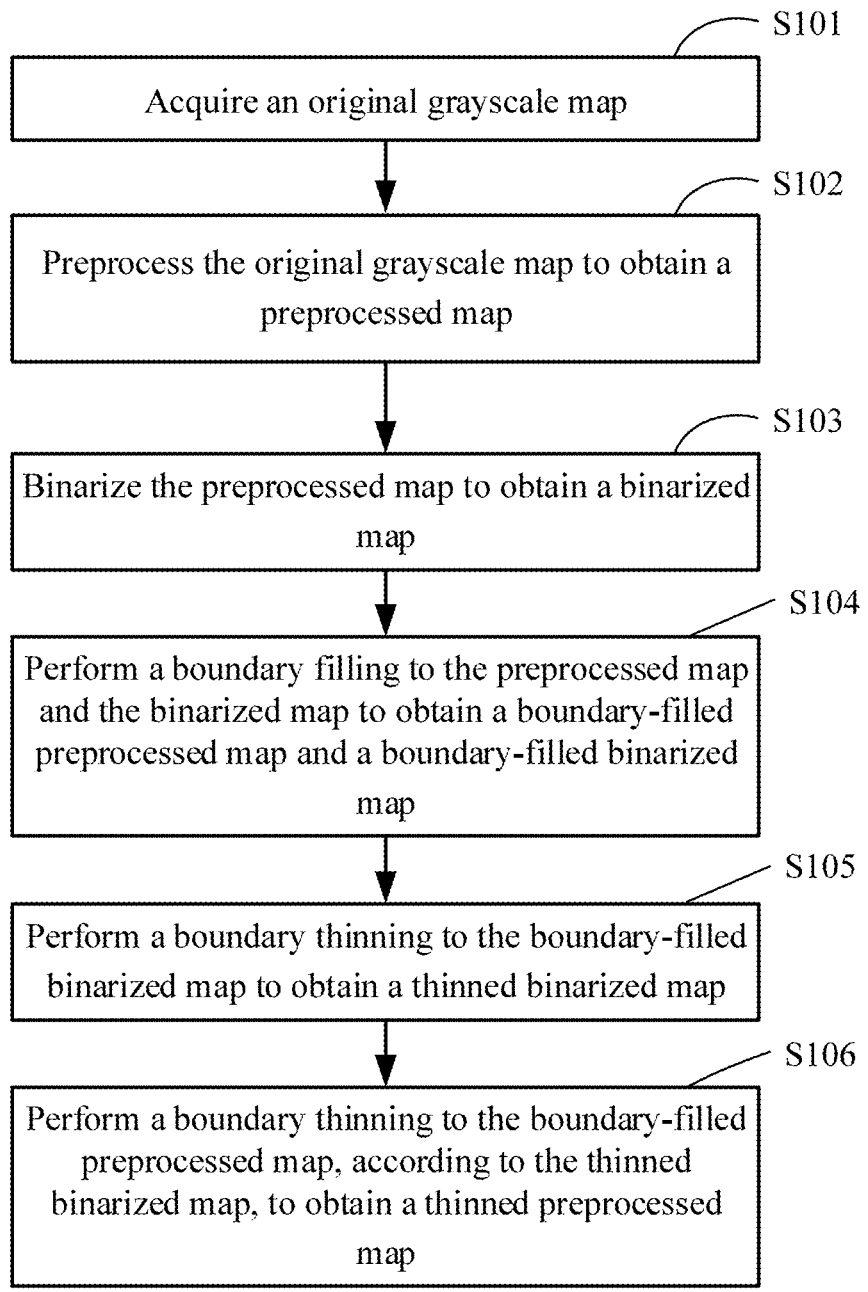
FIG. 2 is flowchart of a map building method according to one embodiment.

Referring to FIG. 2, in one embodiment, a map building method includes the following steps.

Figure 3:
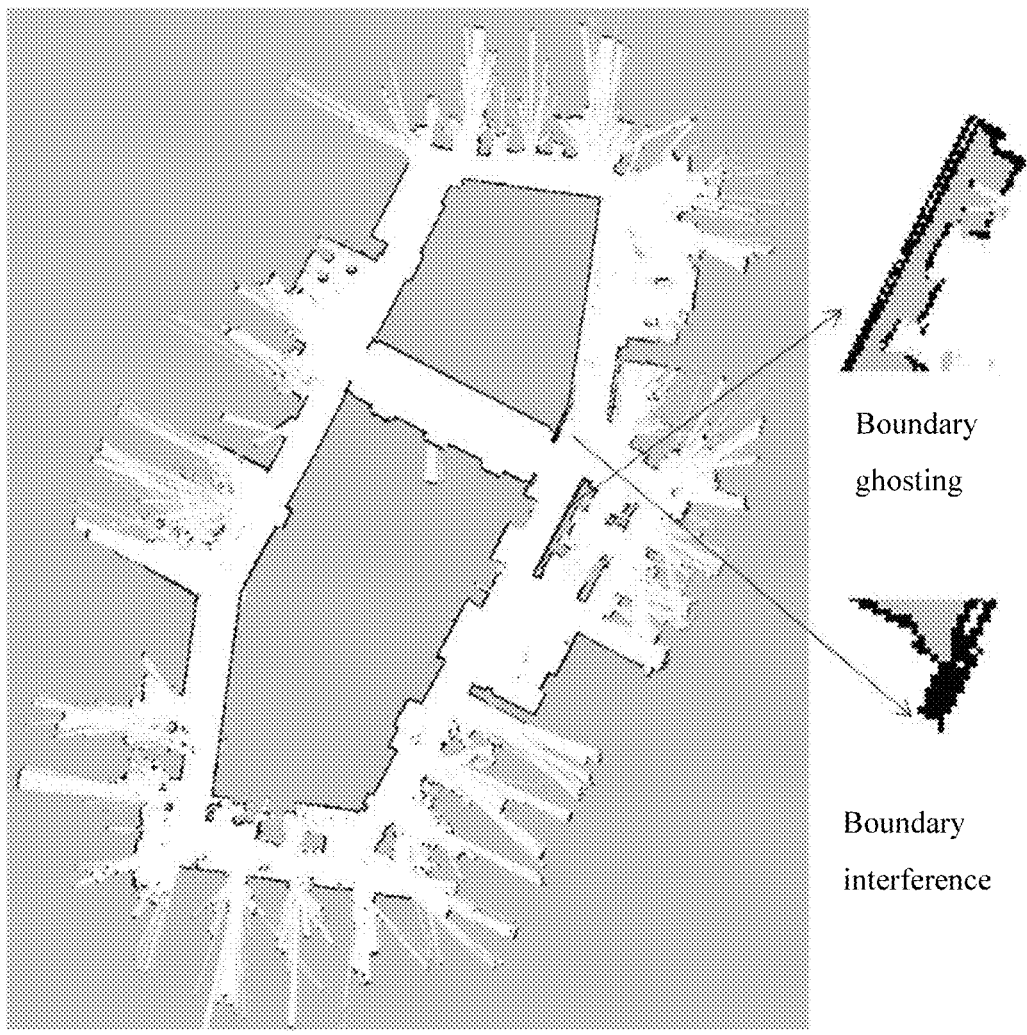
FIG. 3 is an exemplary schematic diagram of an original grayscale map.

Step S101: Acquire an original grayscale map. The original grayscale map is a grid map of surrounding environment generated by the robot 6 having one or more laser sensors. FIG. 3 shows an example of the original grayscale map. In the grayscale map, the black lines represent boundaries such as walls, objects, and the like, the white area represents the area where the robot can move, and the gray areas represent unknown areas. Due to uneven floor, poor sensor performance indicators, and robots running back and forth on the same path many times, the boundaries of the original grayscale map may have ghost image problem and/or boundary interference problem.

Step S102: Preprocess the original grayscale map to obtain a preprocessed map. The pixel value of each pixel in the original grayscale map is generally in the range from 0 to 255. To facilitate processing, the original grayscale map can be preprocessed. Specifically, the pixel value of each pixel of the original grayscale map is set to be 0, 205, or 255, which represent black, gray, and white, respectively. In one embodiment, The original grayscale map can be preprocessed according to the following formula:

$$I_1(x, y) = \begin{cases} 0 & 0 \le I_0(x, y) < \text{minPixel} \\ 205 & \text{minPixel} \le I_0(x, y) < \text{maxPixel} \\ 255 & \text{maxPixel} \le I_0(x, y) \le 255 \end{cases}$$

where $I_0(x,y)$ and $I_1(x,y)$ represent pixel value of any pixel in the original grayscale map and the preprocessed map, respectively, minPixel and maxPixel represent preset pixel thresholds, and their specific values can be set according to actual conditions. In the embodiment, minPixel is set to 50 and maxPixel is set to 240. When the pixel value of a pixel in the original grayscale map is less than minPixel, then the pixel value of the pixel at the same position as the pixel in the preprocessed map is 0. When the pixel value of a pixel in the original grayscale map is greater than or equal to minPixel and less than maxPixel, then the pixel value of the pixel at the same position as the pixel in the preprocessed map is 205. When the pixel value of a pixel in the original grayscale map is greater than or equal to maxPixel, then the pixel value of the pixel at the same position as the pixel in the preprocessed map is 255.

Step S103: Binarize the preprocessed map to obtain a binarized map. Specifically, the pixel value of each pixel of the preprocessed map is set to 0 or 255, which represent black and white respectively, thereby obtaining the binarized map. During binarization, the preprocessed map needs to be traversed pixel by pixel. If a pixel value is 205 or 255, which represents gray or white, then the pixel value of the pixel at the same position in the binarized map is set to 255, which represents white. If a pixel value is 0, which represents black, it then determines whether there is an effective structure in which black pixels are connected to one another or gray and/or black pixels are connected to one another in a 3×3 grid with the pixel as the center. If so, it means that it is an object or wall exists and the pixel values of the corresponding positions of the binarized map needs to remain 0. Otherwise, it is likely to be isolated sensor noise, which needs to be filtered out, so the pixel value of the pixel at corresponding position of the binarized map is set to 255.

Step S104: Perform a boundary filling to the preprocessed map and the binarized map to obtain a boundary-filled preprocessed map and a boundary-filled binarized map.

Specifically, a black boundary of the binarized map is determined. In one embodiment, a region growth algorithm can be used to extract and save all black boundaries in the binary map. The region growth algorithm can be implemented either based on breadth-first traversal or depth-first traversal.

Then, a boundary filling is performed to the preprocessed map and the binarized map, with each black pixel within the black boundary of the binarized map being a center, so as to obtain the boundary-filled preprocessed map and the boundary-filled binarized map.

The specific process of boundary filling is shown in FIG. 3. Step S1041: Search for white pixels in eight-neighbor pixels of each of three-value target pixels. The three-value target pixels are pixels at same positions as binary target pixels in the preprocessed map, and the binary target pixels are pixels in the black boundary of the binarized map. If a white pixel is found, then the procedure goes to step S1041.

Step S1042: Record each pixel scanned on a ghost detection line until a gray pixel is scanned, if a white pixel is found. The ghost detection line is a ray directed from the found white pixel to a corresponding three-value target pixel. A threshold of the maximum number of connected pixels that can be scanned in the direction of the ghost detection line can be preset. This threshold is denoted as maxDetectedPixel, and its value can be set according to actual conditions. In the embodiment, maxDetectedPixel is set to 5. Generally, in engineering practice, one pixel in a rasterized map is equal to 5 centimeters in real life. If the threshold is set to 5, because the effective ghost detection line that can be filled must have two connected black and gray pixels as the endpoints, the ghosting area that can be filled has a maximum width of three consecutive white pixels. That is, ghosting area that is no more than 15 centimeters can be processed.

If a number of recorded pixels is less than a preset value (i.e., maxDetectedPixel), and the last recorded pixel is a black pixel, the procedure goes to step S1043.

Step S1043: Perform a filling to pixels to be filled in the binarized map and the preprocessed map, if a number of recorded pixels is less than a preset value and the last recorded pixel is a black pixel.

The white pixels in the recorded pixels may be identified as the pixels to be filled in the preprocessed map, and the pixels in the binarized map at the same position as the pixels to be filled in the preprocessed map may be identified as the pixels to be filled in the binarized map. Finally, the pixels to be filled in the binarized map and the pixels to be filled in the preprocessed map are all set as black pixels.

Figure 4:
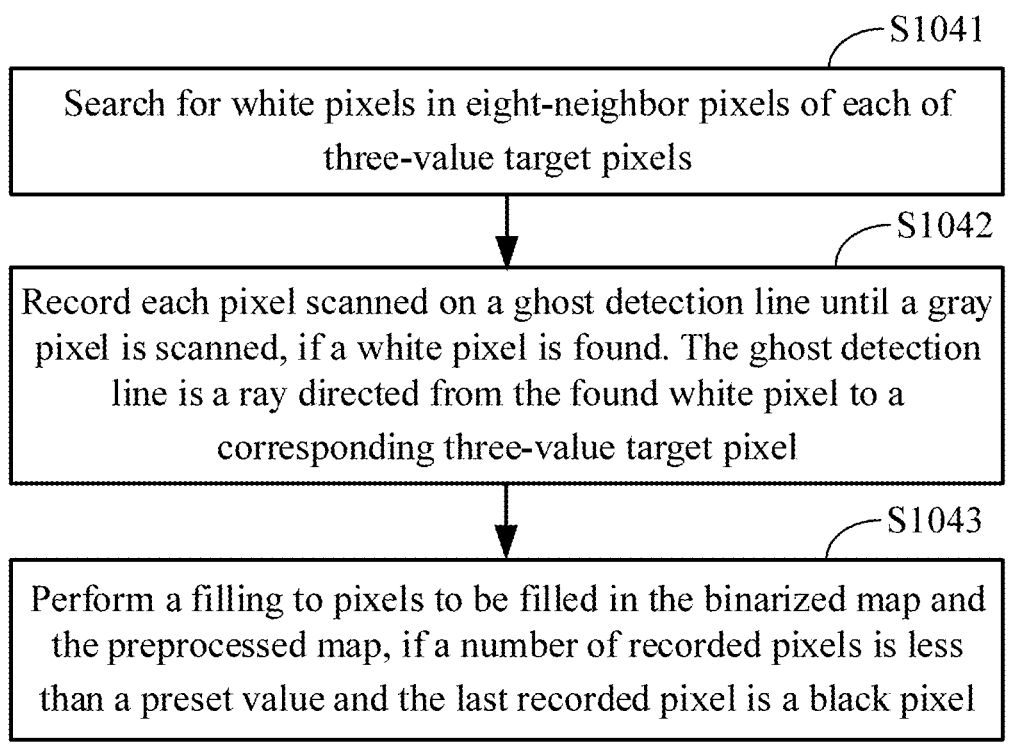
FIG. 4 is a flowchart of boundary filling according to one embodiment.

Each black pixel in the black boundary of the binarized map is traversed. The process shown in FIG. 4 is performed so as to perform boundary filling on the preprocessed map and the binarized map. The preprocessed map obtained after the boundary filling is the boundary-filled preprocessed map, and the binarized map obtained after the boundary filling is the boundary-filled binarized map. Now, the problem of boundary ghosting has been transformed into a boundary interference problem.

Step S105: Perform a boundary thinning to the boundary-filled binarized map to obtain a thinned binarized map.

In order to solve the boundary interference problem, the map needs a thinning process. That is, all the thick boundaries of the multi-pixel aggregation in the map are thinned to have a width of one pixel. In the embodiment, a binary image edge thinning algorithm may be used to refine the boundary of the boundary-filled binarized map to obtain a thinned binarized map. The binary image edge refinement algorithm includes but is not limited to the fast parallel algorithm proposed by Zhang and Suen, Hilditch, Pavlidis, Rosenfeld thinning algorithms, and index table thinning algorithm.

Step S106: Perform a boundary thinning to the boundary-filled preprocessed map, according to the thinned binarized map, to obtain a thinned preprocessed map.

In the thinned binarized map obtained through boundary thinning, redundant black pixels are removed, and the actual boundary of the wall or object is changed, so a merge operation is required to update the boundary-filled preprocessed map. Specifically, First, the pixels in the boundary-filled preprocessed map that are at the same positions as the black pixels in the thinned binarized map are set as black pixels. Then, the pixels to be thinned in the boundary-filled preprocessed map are determined, and the pixels to be thinned are black pixels at the same positions as the white pixels in the thinned binarized map. If a number of white pixels in eight-neighbor pixels of the pixels to be thinned is greater than a number of gray pixels, the pixels to be thinned are set as white pixels. If the number of white pixels in eight-neighbor pixels of the pixels to be thinned is less than the number of gray pixels, the pixels to be thinned are set as gray pixels. After the processing, the thinned preprocessed map is obtained.

In one embodiment, the thinned preprocessed map can be directly used as the final result. Although the thinned preprocessed map has solved the problems of boundary interference and boundary ghosting, it may worsen the problem of black boundary extending to the gray areas and the problem of black objects remaining outside the boundary of black walls. In other embodiments, after the thinned preprocessed map is obtained, the black boundary of the thinned binarized map can also be extracted (similar to the boundary extraction process in step S104), and a boundary filling is performed to the thinned preprocessed map and the thinned binarized map, with each black pixel within the black boundary of the thinned binarized map being a center, so as to obtain an optimized preprocessed map and the optimized binarized map.

Taking any black pixel in the black boundary of the thinned binary map as an example, the specific process of optimization processing may include the following steps.

First, count a number of white pixels in the eight-neighbor pixels of the thinned three-value target pixels, wherein the thinned three-value target pixels are pixels at same positions as thinned binary target pixels in the thinned preprocessed map, and the thinned binary target pixels are pixels in the black boundary of the thinned binarized map.

If the counted number of the white pixels is equal to 0, it means that the black boundary is not adjacent to a white area where a robot can move. That is, the black boundary has extended to the gray area. This situation does not comply with the projection scanning law of laser white, black and gray and needs to be filtered out. The specific filtering process is as follows: set the thinned three-value target pixels as gray pixels, and set the thinned binary target pixels as white pixels.

If the counted number of the white pixels is greater than 0, it can then determine whether each of the scan line is blocked by black pixels within a preset distance. The scan lines are rays directed from gray pixels in eight-neighbor pixels of each of the thinned three-value target pixels to a corresponding one of the thinned three-value target pixels. The number of scan lines is the same as the number of gray pixels in the eight-neighbor pixels, which means that the ray from any gray pixel in the eight-neighbor pixels to a thinned three-value target pixel is a scan line. The distance is denoted as maxScannedPixel. The value of the maxScannedPixel can be set according to actual situations. The value is based on the ratio of the actual diameter of the robot to the actual distance which a single pixel in the grid map is equal to. If the actual diameter of the robot is 50 cm, and one pixel on the grid map is equal to a distance of 5 cm in real life, the maxScannedPixel can be set to 10, which means that the maximum scan storage is 10 pixels. If all scanning attempts in the gray and black straight-line directions of the thinned three-value target pixels are blocked by the black boundary, it means that the thinned three-value target pixels are likely to belong to the remaining object boundary outside the black wall boundary. Because the robot cannot be accommodated near the white area, it is impossible to produce the boundary according to the projection law of laser white, black and gray, and these pixels need to be filtered out. The filtering process is as follows: set the thinned three-value target pixels and white pixels on each of scan lines as gray pixels, and set the thinned binary target pixel as white pixels. If at least one scan line is not blocked by black pixels within the preset distance, no action is required.

Each black pixel in the black boundary of the thinned binarized map is traversed. The above-mentioned optimization process is performed so as to perform optimization on the thinned preprocessed map and the thinned binarized map. The preprocessed map obtained after the optimization process is the optimized preprocessed map, and the binarized map obtained after the optimization process is the optimized binarized map.

Figure 5:
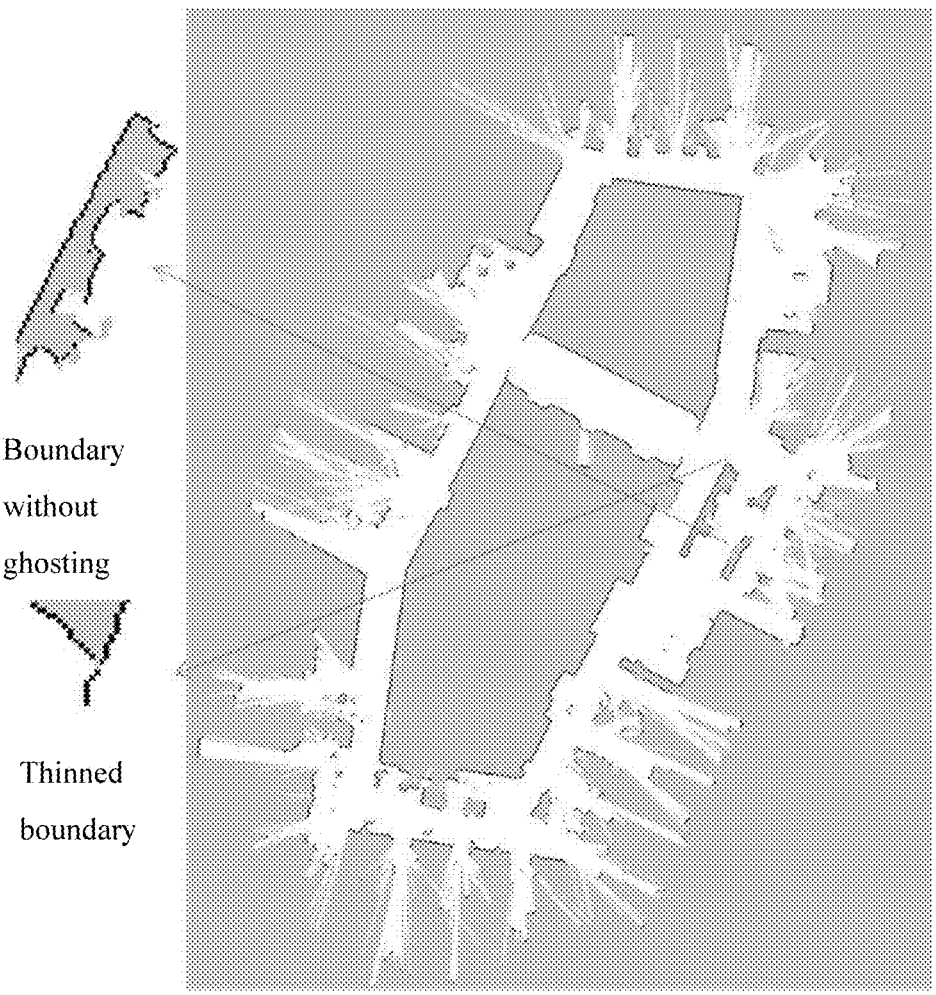
FIG. 5 is an exemplary schematic diagram of a refined map without ghosting obtained by processing the original grayscale map of FIG. 3.

The thinned preprocessed map can be used as the final result, as shown in FIG. 5, which is the final result obtained by processing the original grayscale map shown in FIG. 3. It can be seen from the FIG. 5 that the boundary interference and ghosting problems have been effectively eliminated, and a refined map without ghosting has been obtained.

With the above-mentioned method, the boundary interference and ghosting problems are solved without increasing hardware cost. By performing a series of image processing on the original grayscale map, the boundary interference and ghosting problems can be eliminated, which facilitates wide application.

It should be understood that, sequence numbers of the foregoing procedures do not indicate an execution sequence. The execution sequence of the procedures should be determined according to functions and internal logic thereof, and should not constitute any limitation to the implementation procedure of the embodiments of the present disclosure.

Referring to FIG. 6, in one embodiment, a map building device includes a map acquiring module 501, a preprocessing module 502, a binarization processing module 503, a boundary filling module 504, a binarization thinning module 505, and a preprocess thinning module 506.

The map acquiring module 501 is configured to acquire an original grayscale map. The preprocessing module 502 is configured to preprocess the original grayscale map to obtain a preprocessed map. The binarization processing module 503 is configured to binarize the preprocessed map to obtain a binarized map. The boundary filling module 504 is configured to perform a boundary filling to the preprocessed map and the binarized map to obtain a boundary-filled preprocessed map and a boundary-filled binarized map. The binarization thinning module 505 is configured to perform a boundary thinning to the boundary-filled binarized map to obtain a thinned binarized map. The preprocess thinning module 506 is configured to perform a boundary thinning to the boundary-filled preprocessed map, according to the thinned binarized map, to obtain a thinned preprocessed map.

In one embodiment, the boundary filling module 504 may include a boundary extraction submodule and a boundary filling submodule. The boundary extraction submodule is configured to determine a black boundary of the binarized map. The boundary filling submodule is configured to perform a boundary filling to the preprocessed map and the binarized map, with each black pixel within the black boundary of the binarized map being a center, so as to obtain the boundary-filled preprocessed map and the boundary-filled binarized map.

In one embodiment, the boundary filling submodule may include a pixel searching unit, a pixel recording unit, and a pixel filling unit. The pixel searching unit is configured to search for white pixels in eight-neighbor pixels of each of three-value target pixels. The three-value target pixels are pixels at same positions as binary target pixels in the preprocessed map, and the binary target pixels are pixels in the black boundary of the binarized map. The pixel recording unit is configured to record each pixel scanned on a ghost detection line until a gray pixel is scanned, if a white pixel is found. The ghost detection line is a ray directed from the found white pixel to a corresponding three-value target pixel. The pixel filling unit is configured to perform a filling to pixels to be filled in the binarized map and the preprocessed map, if a number of recorded pixels is less than a preset value and a last recorded pixel is a black pixel.

In one embodiment, the pixel filling unit may include a first identifying submodule, a second identifying submodule, and a pixel filling submodule. The first determining submodule is configured to identify white pixels in the recorded pixels as pixels to be filled in the preprocessed map. The second identifying submodule is configured to identify pixels in the binarized map at same positions as pixels to be filled in the preprocessed map as pixels to be filled in the binarized map. The pixel filling submodule is configured to set the pixels to be filled in the binarized map and the pixels to be filled in the preprocessed map as black pixels.

In one embodiment, the preprocess thinning module 506 may include a first setting submodule, a thinning pixel determining submodule, a second setting submodule, and a third setting submodule. The first setting submodule is configured to set the pixels in the boundary-filled preprocessed map at same positions as the black pixels in the thinned binarized map as black pixels. The thinning pixel determining submodule is configured to determining pixels to be thinned in the boundary-filled preprocessed map. The pixels to be thinned are black pixels at same positions as white pixels in the thinned binarized map. The second setting submodule is configured to set the pixels to be thinned as white pixels, if a number of white pixels in eight-neighbor pixels of the pixels to be thinned is greater than a number of gray pixels. The third setting submodule is configured to set the pixels to be thinned as gray pixels, if the number of white pixels in eight-neighbor pixels of the pixels to be thinned is less than or equal to the number of gray pixels.

In one embodiment, the map building device may further include a boundary extraction module and an optimization module. The boundary extraction module is configured to determine a black boundary of the thinned binarized map. The optimization module is configured to perform an optimization to the thinned preprocessed map and the thinned binarized map, with each black pixel within the black boundary of the thinned binarized map being a center, so as to obtain optimized preprocessed map and optimized binarized map.

In one embodiment, the optimization module may include a counting submodule, a first optimization submodule, and a second optimization submodule. The counting submodule is configured to count a number of white pixels in the eight-neighbor pixels of the thinned three-value target pixels. The thinned three-value target pixels are pixels at same positions as thinned binary target pixels in the thinned preprocessed map, and the thinned binary target pixels are pixels in the black boundary of the thinned binarized map. The first optimization submodule is configured to set the thinned three-value target pixels as gray pixels, and set the thinned binary target pixels as white pixels, if the counted number of the white pixels is 0. The second optimization submodule is configured to set the thinned three-value target pixels and white pixels on each of scan lines as gray pixels, and set the thinned binary target pixel as white pixels, if the counted number of the white pixels is greater than 0 and each of the scan line is blocked by black pixels within a preset distance. The scan lines are rays directed from gray pixels in eight-neighbor pixels of each of the thinned three-value target pixels to a corresponding one of the thinned three-value target pixels.

Those skilled in the art will understand that, for the convenience and conciseness of description, the specific working processes of the devices, modules, and units described above can refer to the corresponding processes in the foregoing method embodiments, which will not be repeated here.

In the above-mentioned embodiments, the description of each embodiment has its own emphasis. For parts that are not described in detail, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for building a map, comprising executing on a processor steps of:
    acquiring an original grayscale map;
    preprocessing the original grayscale map to obtain a preprocessed map;
    binarizing the preprocessed map to obtain a binarized map;
    performing a boundary filling to the preprocessed map and the binarized map to obtain a boundary-filled preprocessed map and a boundary-filled binarized map;
    performing a boundary thinning to the boundary-filled binarized map to obtain a thinned binarized map; and
    performing a boundary thinning to the boundary-filled preprocessed map, according to the thinned binarized map, to obtain a thinned preprocessed map;
    wherein the step of performing the boundary filling to the preprocessed map and the binarized map to obtain the boundary-filled preprocessed map and the boundary-filled binarized map comprises:
    determining a black boundary of the binarized map; and
    performing a boundary filling to the preprocessed map and the binarized map, with each black pixel within the black boundary of the binarized map being a center, so as to obtain the boundary-filled preprocessed map and the boundary-filled binarized map.

2. The method according to claim 1, wherein the step of performing a boundary filling to the preprocessed map and the binarized map, with each black pixel within the black boundary of the binarized map being a center, comprises:
    searching for white pixels in eight-neighbor pixels of each of three-value target pixels, wherein the three-value target pixels are pixels at same positions as binary target pixels in the preprocessed map, and the binary target pixels are pixels in the black boundary of the binarized map;
    recording each pixel scanned on a ghost detection line until a gray pixel is scanned, if a white pixel is found, wherein the ghost detection line is a ray directed from the found white pixel to a corresponding three-value target pixel; and
    performing a filling to pixels to be filled in the binarized map and the preprocessed map, if a number of recorded pixels is less than a preset value and a last recorded pixel is a black pixel.

3. The method according to claim 2, wherein the step of performing a filling to pixels to be filled in the binarized map and the preprocessed map, comprises:
    identifying white pixels in the recorded pixels as pixels to be filled in the preprocessed map;
    identifying pixels in the binarized map at same positions as pixels to be filled in the preprocessed map as pixels to be filled in the binarized map; and setting the pixels to be filled in the binarized map and the pixels to be filled in the preprocessed map as black pixels.

4. The method according to claim 1, wherein the step of performing a boundary thinning to the boundary-filled preprocessed map, according to the thinned binarized map, to obtain a thinned preprocessed map, comprises:
   setting the pixels in the boundary-filled preprocessed map at same positions as the black pixels in the thinned binarized map as black pixels;
   determining pixels to be thinned in the boundary-filled preprocessed map, wherein the pixels to be thinned are black pixels at same positions as white pixels in the thinned binarized map;
   setting the pixels to be thinned as white pixels, if a number of white pixels in eight-neighbor pixels of the pixels to be thinned is greater than a number of gray pixels; and
   setting the pixels to be thinned as gray pixels, if the number of white pixels in eight-neighbor pixels of the pixels to be thinned is less than or equal to the number of gray pixels.

5. The method according to claim 1, further comprising, after the step of performing a boundary thinning to the boundary-filled preprocessed map, according to the thinned binarized map, to obtain a thinned preprocessed map,
   determining a black boundary of the thinned binarized map; and
   performing an optimization to the thinned preprocessed map and the thinned binarized map, with each black pixel within the black boundary of the thinned binarized map being a center, so as to obtain optimized preprocessed map and optimized binarized map.

6. The method according to claim 5, wherein the step of performing an optimization to the thinned preprocessed map and the thinned binarized map, with each black pixel within the black boundary of the thinned binarized map being a center, so as to obtain optimized preprocessed map and optimized binarized map, comprises:
   counting a number of white pixels in the eight-neighbor pixels of the thinned three-value target pixels, wherein the thinned three-value target pixels are pixels at same positions as thinned binary target pixels in the thinned preprocessed map, and the thinned binary target pixels are pixels in the black boundary of the thinned binarized map;
   setting the thinned three-value target pixels as gray pixels, and setting the thinned binary target pixels as white pixels, if the counted number of the white pixels is 0; and
   setting the thinned three-value target pixels and white pixels on each of scan lines as gray pixels, and setting the thinned binary target pixel as white pixels, if the counted number of the white pixels is greater than 0 and each of the scan line is blocked by black pixels within a preset distance, wherein the scan lines are rays directed from gray pixels in eight-neighbor pixels of each of the thinned three-value target pixels to a corresponding one of the thinned three-value target pixels.

7. A non-transitory computer readable storage medium having stored therein instructions, which when executed by a robot, cause the robot to perform a method for building a map, the method comprising executing on a processor steps of:
   acquiring an original grayscale map;
   preprocessing the original grayscale map to obtain a preprocessed map;
   binarizing the preprocessed map to obtain a binarized map;
   performing a boundary filling to the preprocessed map and the binarized map to obtain a boundary-filled preprocessed map and a boundary-filled binarized map;
   performing a boundary thinning to the boundary-filled binarized map to obtain a thinned binarized map; and
   performing a boundary thinning to the boundary-filled preprocessed map, according to the thinned binarized map, to obtain a thinned preprocessed map;
   wherein the step of performing the boundary thinning to the boundary-filled preprocessed map, according to the thinned binarized map, to obtain the thinned preprocessed map, comprises:
   setting the pixels in the boundary-filled preprocessed map at same positions as the black pixels in the thinned binarized map as black pixels;
   determining pixels to be thinned in the boundary-filled preprocessed map, wherein the pixels to be thinned are black pixels at same positions as white pixels in the thinned binarized map;
   setting the pixels to be thinned as white pixels, if a number of white pixels in eight-neighbor pixels of the pixels to be thinned is greater than a number of gray pixels; and
   setting the pixels to be thinned as gray pixels, if the number of white pixels in eight-neighbor pixels of the pixels to be thinned is less than or equal to the number of gray pixels.

8. The non-transitory computer readable storage medium according to claim 7, wherein the step of performing a boundary filling to the preprocessed map and the binarized map to obtain a boundary-filled preprocessed map and a boundary-filled binarized map comprises:
   determining a black boundary of the binarized map; and
   performing a boundary filling to the preprocessed map and the binarized map, with each black pixel within the black boundary of the binarized map being a center, so as to obtain the boundary-filled preprocessed map and the boundary-filled binarized map.

9. The non-transitory computer readable storage medium according to claim 8, wherein the step of performing a boundary filling to the preprocessed map and the binarized map, with each black pixel within the black boundary of the binarized map being a center, comprises:
   searching for white pixels in eight-neighbor pixels of each of three-value target pixels, wherein the three-value target pixels are pixels at same positions as binary target pixels in the preprocessed map, and the binary target pixels are pixels in the black boundary of the binarized map;
   recording each pixel scanned on a ghost detection line until a gray pixel is scanned, if a white pixel is found, wherein the ghost detection line is a ray directed from the found white pixel to a corresponding three-value target pixel; and
   performing a filling to pixels to be filled in the binarized map and the preprocessed map, if a number of recorded pixels is less than a preset value and a last recorded pixel is a black pixel.

10. The non-transitory computer readable storage medium according to claim 9, wherein the step of performing a filling to pixels to be filled in the binarized map and the preprocessed map, comprises:
    identifying white pixels in the recorded pixels as pixels to be filled in the preprocessed map;

identifying pixels in the binarized map at same positions as pixels to be filled in the preprocessed map as pixels to be filled in the binarized map; and setting the pixels to be filled in the binarized map and the pixels to be filled in the preprocessed map as black pixels.

11. The non-transitory computer readable storage medium according to claim 7, further comprising, after the step of performing a boundary thinning to the boundary-filled preprocessed map, according to the thinned binarized map, to obtain a thinned preprocessed map, determining a black boundary of the thinned binarized map; and performing an optimization to the thinned preprocessed map and the thinned binarized map, with each black pixel within the black boundary of the thinned binarized map being a center, so as to obtain optimized preprocessed map and optimized binarized map.

12. The non-transitory computer readable storage medium according to claim 11, wherein the step of performing an optimization to the thinned preprocessed map and the thinned binarized map, with each black pixel within the black boundary of the thinned binarized map being a center, so as to obtain optimized preprocessed map and optimized binarized map, comprises:

counting a number of white pixels in the eight-neighbor pixels of the thinned three-value target pixels, wherein the thinned three-value target pixels are pixels at same positions as thinned binary target pixels in the thinned preprocessed map, and the thinned binary target pixels are pixels in the black boundary of the thinned binarized map;

setting the thinned three-value target pixels as gray pixels, and setting the thinned binary target pixels as white pixels, if the counted number of the white pixels is 0; and setting the thinned three-value target pixels and white pixels on each of scan lines as gray pixels, and setting the thinned binary target pixel as white pixels, if the counted number of the white pixels is greater than 0 and each of the scan line is blocked by black pixels within a preset distance, wherein the scan lines are rays directed from gray pixels in eight-neighbor pixels of each of the thinned three-value target pixels to a corresponding one of the thinned three-value target pixels.

13. A robot comprising:
one or more processors;
a storage; and
one or more computer programs stored in the storage and configured to be executed by the one or more processors to perform a method, the method comprising steps of:
acquiring an original grayscale map;
preprocessing the original grayscale map to obtain a preprocessed map;
binarizing the preprocessed map to obtain a binarized map;
performing a boundary filling to the preprocessed map and the binarized map to obtain a boundary-filled preprocessed map and a boundary-filled binarized map;
performing a boundary thinning to the boundary-filled binarized map to obtain a thinned binarized map;
performing a boundary thinning to the boundary-filled preprocessed map, according to the thinned binarized map, to obtain a thinned preprocessed map;
determining a black boundary of the thinned binarized map; and performing an optimization to the thinned preprocessed map and the thinned binarized map, with each black pixel within the black boundary of the thinned binarized map being a center, so as to obtain optimized preprocessed map and optimized binarized map.

14. The robot according to claim 13, wherein the step of performing a boundary filling to the preprocessed map and the binarized map to obtain a boundary-filled preprocessed map and a boundary-filled binarized map comprises:

determining a black boundary of the binarized map; and
performing a boundary filling to the preprocessed map and the binarized map, with each black pixel within the black boundary of the binarized map being a center, so as to obtain the boundary-filled preprocessed map and the boundary-filled binarized map.

15. The robot according to claim 14, wherein the step of performing a boundary filling to the preprocessed map and the binarized map, with each black pixel within the black boundary of the binarized map being a center, comprises:

searching for white pixels in eight-neighbor pixels of each of three-value target pixels, wherein the three-value target pixels are pixels at same positions as binary target pixels in the preprocessed map, and the binary target pixels are pixels in the black boundary of the binarized map;

recording each pixel scanned on a ghost detection line until a gray pixel is scanned, if a white pixel is found, wherein the ghost detection line is a ray directed from the found white pixel to a corresponding three-value target pixel; and performing a filling to pixels to be filled in the binarized map and the preprocessed map, if a number of recorded pixels is less than a preset value and a last recorded pixel is a black pixel.

16. The robot according to claim 15, wherein the step of performing a filling to pixels to be filled in the binarized map and the preprocessed map, comprises:

identifying white pixels in the recorded pixels as pixels to be filled in the preprocessed map;

identifying pixels in the binarized map at same positions as pixels to be filled in the preprocessed map as pixels to be filled in the binarized map; and setting the pixels to be filled in the binarized map and the pixels to be filled in the preprocessed map as black pixels.

17. The robot according to claim 14, wherein all black boundaries in the binary map are extracted and saved by using a region growth algorithm.

18. The robot according to claim 17, wherein the region growth algorithm is implemented based on breadth-first traversal or depth-first traversal.

19. The robot according to claim 13, wherein the step of performing a boundary thinning to the boundary-filled preprocessed map, according to the thinned binarized map, to obtain a thinned preprocessed map, comprises:

setting the pixels in the boundary-filled preprocessed map at same positions as the black pixels in the thinned binarized map as black pixels;

determining pixels to be thinned in the boundary-filled preprocessed map, wherein the pixels to be thinned are black pixels at same positions as white pixels in the thinned binarized map;

setting the pixels to be thinned as white pixels, if a number of white pixels in eight-neighbor pixels of the pixels to be thinned is greater than a number of gray pixels; and setting the pixels to be thinned as gray pixels, if the number of white pixels in eight-neighbor pixels of the pixels to be thinned is less than or equal to the number of gray pixels.

20. The robot according to claim 13, wherein the step of performing an optimization to the thinned preprocessed map and the thinned binarized map, with each black pixel within the black boundary of the thinned binarized map being a center, so as to obtain optimized preprocessed map and optimized binarized map, comprises:

counting a number of white pixels in the eight-neighbor pixels of the thinned three-value target pixels, wherein the thinned three-value target pixels are pixels at same positions as thinned binary target pixels in the thinned preprocessed map, and the thinned binary target pixels are pixels in the black boundary of the thinned binarized map;

setting the thinned three-value target pixels as gray pixels, and setting the thinned binary target pixels as white pixels, if the counted number of the white pixels is 0; and setting the thinned three-value target pixels and white pixels on each of scan lines as gray pixels, and setting the thinned binary target pixel as white pixels, if the counted number of the white pixels is greater than 0 and each of the scan line is blocked by black pixels within a preset distance, wherein the scan lines are rays directed from gray pixels in eight-neighbor pixels of each of the thinned three-value target pixels to a corresponding one of the thinned three-value target pixels.

* * * * *